United States Patent
Nakamura

(10) Patent No.: US 7,001,215 B2
(45) Date of Patent: Feb. 21, 2006

(54) CONNECTOR WITH INNER AND OUTER HOUSINGS

(75) Inventor: Hideto Nakamura, Yokkaichi (JP)

(73) Assignee: Sumitomo Wiring Systems, Ltd., (JP)

( * ) Notice: Subject to any disclaimer, the term of this patent is extended or adjusted under 35 U.S.C. 154(b) by 96 days.

(21) Appl. No.: 10/686,406

(22) Filed: Oct. 14, 2003

(65) Prior Publication Data

US 2004/0076466 A1   Apr. 22, 2004

(30) Foreign Application Priority Data

Oct. 15, 2002  (JP) .............................. 2002-300950

(51) Int. Cl.
*H01R 13/40* (2006.01)
(52) U.S. Cl. ..................................... 439/598
(58) Field of Classification Search ................ 439/598, 439/701, 695, 686, 903, 589
See application file for complete search history.

(56) References Cited

U.S. PATENT DOCUMENTS 6,361,378 B1    3/2002  Konoya et al.
6,638,109 B1 *  10/2003  Kurimoto et al. ........... 439/595

\* cited by examiner

*Primary Examiner*—Gary Paumen
*Assistant Examiner*—Phuongchi Nguyen
(74) *Attorney, Agent, or Firm*—Gerald E. Hespos; Anthony J. Casella

(57) ABSTRACT

A connector housing (H) is provided with cavities (C) into which male terminal fittings (10) are insertable from behind. The connector housing (H) is divided into an inner housing (20) and an outer housing (50) into which the inner housing (20) is mountable from front. The outer housing (50) is provided with a receiving portion (59) engageable with a lock (35) in the inner housing (20) to hold undetachably the inner housing (20). A locking surface (59a) of the receiving portion (59) engageable with the lock (35) is exposed backward to outside through the cavity (C).

6 Claims, 15 Drawing Sheets

CONNECTOR WITH INNER AND OUTER HOUSINGS

BACKGROUND OF THE INVENTION

1. Field of the Invention

The invention relates to a connector with inner and outer housings.

2. Description of the Related Art

U.S. Pat. No. 6,361,378 and FIG. 16 herein relate to a connector. With reference to FIG. 16, the connector has outer and inner housings 1 and 2. The outer housing 1 has a receptacle 3 and the inner housing 2 is mountable into the receptacle 3 from the front. A lock 4 is formed on an outer surface of the inner housing 2 and a receiving portion 5 projects from an inner surface of the receptacle 3. The lock 4 engages the receiving portion 5 for holding the inner housing 2 in the receptacle 3. A step 6 is formed at the back of the receptacle 3 and the rear end of the inner housing 2 contacts the step 6 to position the inner housing 2. The outer housing 1 also has cavities 7 for receiving terminal fittings 8. Further, a retainer 9 is mountable into the inner housing 2 for locking the terminal fittings 8 in the cavities 7.

A locking surface 5a of the receiving portion 5 is opposed to the step 6. Accordingly, the outer housing 1 must be molded with molds that open and close along forward and backward directions plus a slidable mold that is slidable along a widthwise direction to form the locking surface 5a of the receiving portion 5.

The slidable mold leads to high costs and requires space for a driving construction for the slidable mold. Thus, there has been a restriction on the size of produceable connectors and it has been difficult to produce small connectors.

The present invention was developed in view of the above problems and an object thereof is to miniaturize a connector while reducing production costs.

SUMMARY OF THE INVENTION

The invention relates to a connector with a connector housing that has at least one cavity for receiving a terminal fitting insertable from behind along an insertion direction. The connector housing is divided into an inner housing and an outer housing into which the inner housing is mountable from the front. A receiving portion is provided in the outer housing and engages a lock in the inner housing to hold the inner housing undetachably. A locking surface of the receiving portion is exposed to the outside through the cavity and is engageable with the lock.

The inner housing is mounted into the outer housing from the front and along the mounting direction. Thus, the lock engages the receiving portion to hold the inner housing undetachably in the outer housing. Thereafter, the terminal fitting is inserted into the cavity from behind and along the insertion direction.

The locking surface of the receiving portion is exposed backward to the outside through the cavity. Thus, the locking surface can be formed by a mold removed backward using the cavity when the outer housing is formed and it is unnecessary to use a slidable mold to form the locking surface of the receiving portion. As a result the connector can be miniaturized and costs can be reduced.

The lock may also serve as at least a part of an inner wall of the cavity while being engaged with the receiving portion.

Insertion of the terminal into the cavity is guided by the lock that also is part of the inner wall of the cavity.

The cavity preferably has a large rear portion, a small front portion and a tapered portion therebetween. The lock preferably is formed with a slanted surface to extend substantially along the tapered portion.

A disengaging jig is used for detaching the inner housing from the outer housing. More particularly, the disengagement jig is inserted into the cavity from behind to push the slanted surface of the lock. Thus, the lock is disengaged from the receiving portion. The slanted surface of the lock has an inclination substantially along the tapered portion. As a result, the lock can be disengaged easily by inserting the disengagement jig straight into the cavity in forward and backward directions, thereby improving a detaching operability.

A retainer may be mountable to the inner housing and has a locking section to lock the terminal fitting. The retainer preferably can be positioned in a first position, where the terminal fitting can be inserted, and a second position, where the terminal fitting is locked to the inner housing. The locking section may form part of an inner wall of the cavity when the retainer is in the first position.

These and other objects advantages of the invention will become more apparent upon reading the following description of preferred embodiments and the drawings. It should be understood that even though embodiments are separately described, single features thereof may be combined to additional embodiments.

DETAILED DESCRIPTION OF THE PREFERRED EMBODIMENTS

Figure 1:
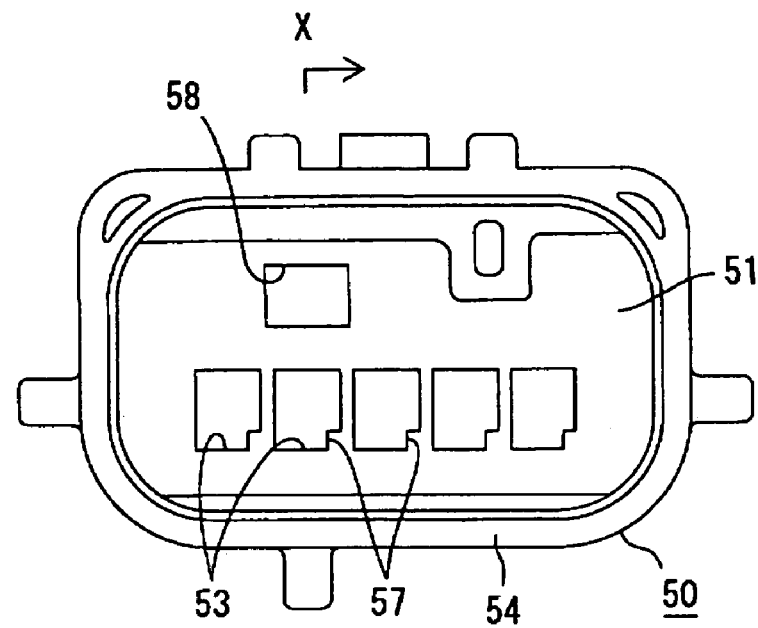
FIG. 1 is a front view of an outer housing, an inner housing and a retainer according to one embodiment of the invention.
Figure 1:
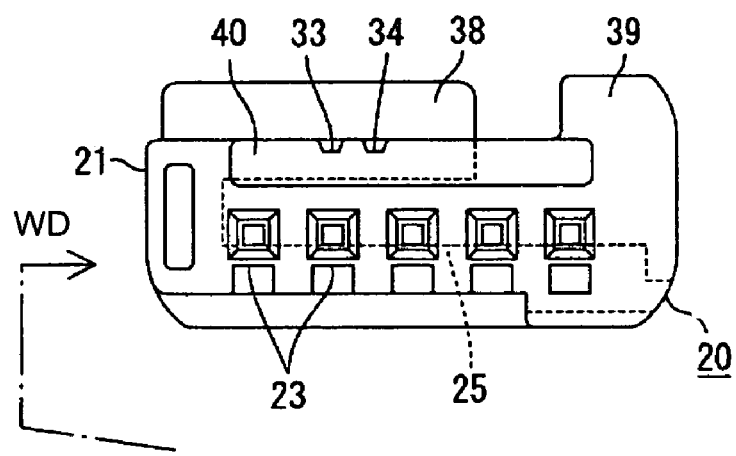
Figure 1:
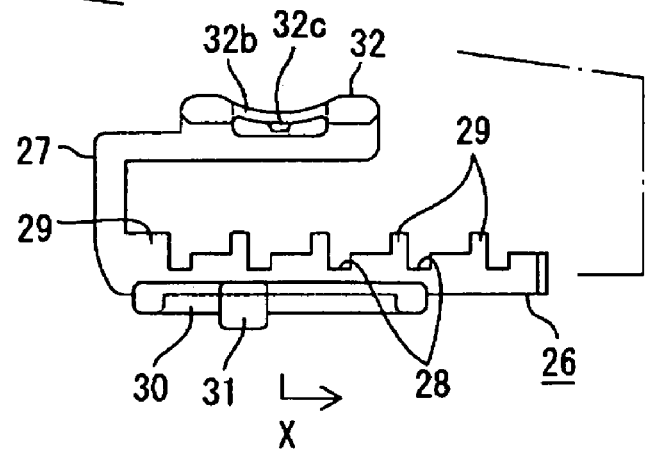
Figure 2:
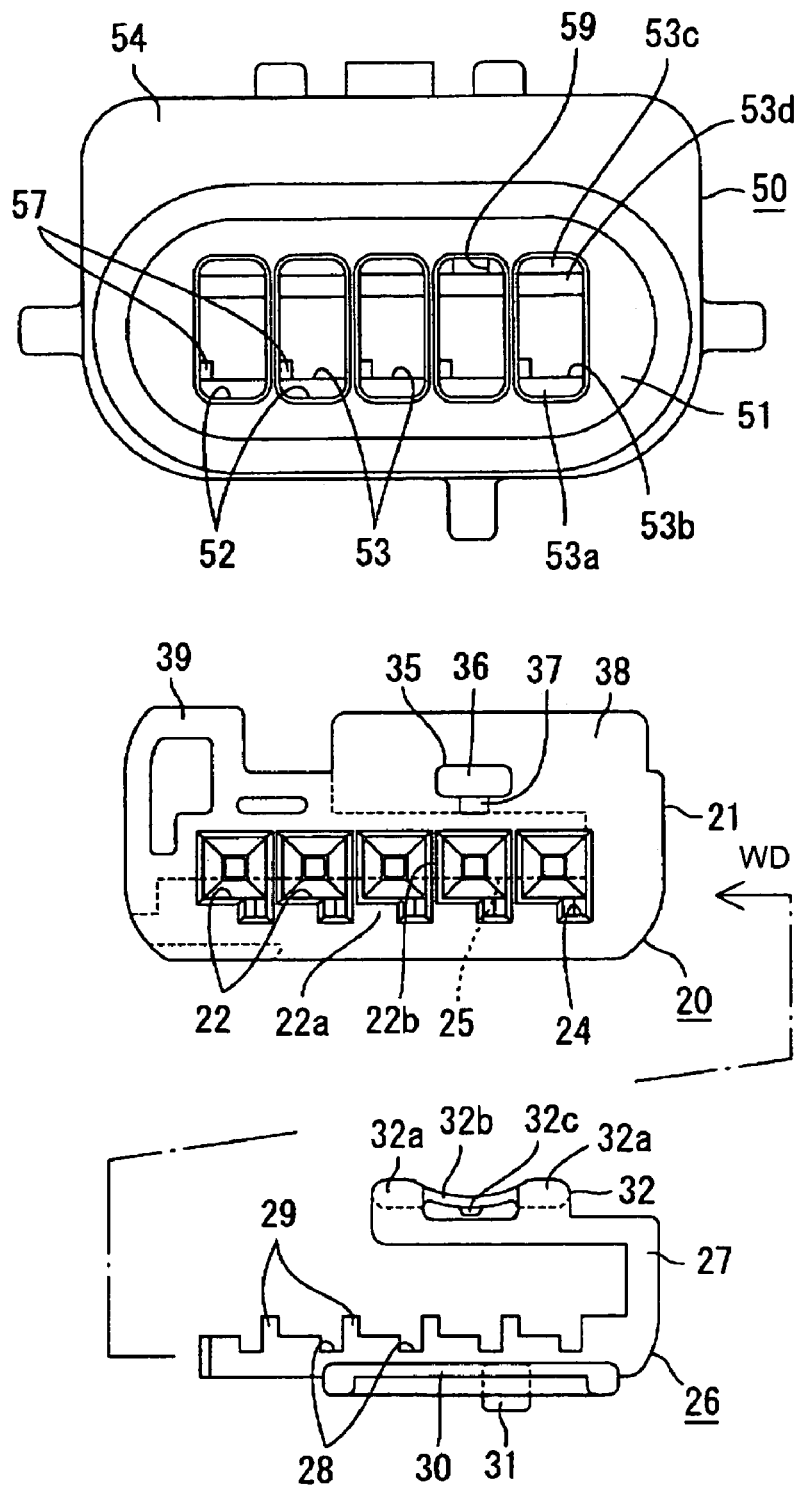
FIG. 2 is a rear view of the outer and inner housings and the retainer.
Figure 3:
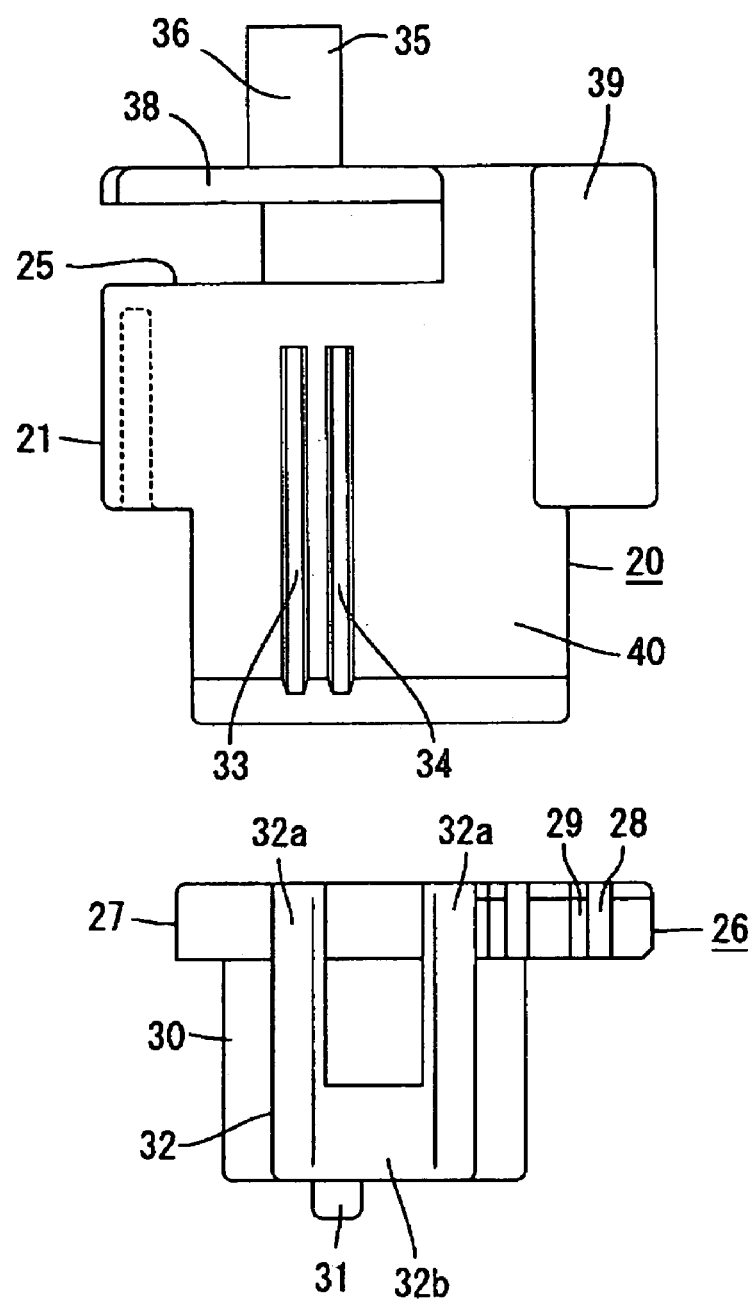
FIG. 3 is a plan view of the inner housing and the retainer.
Figure 4:
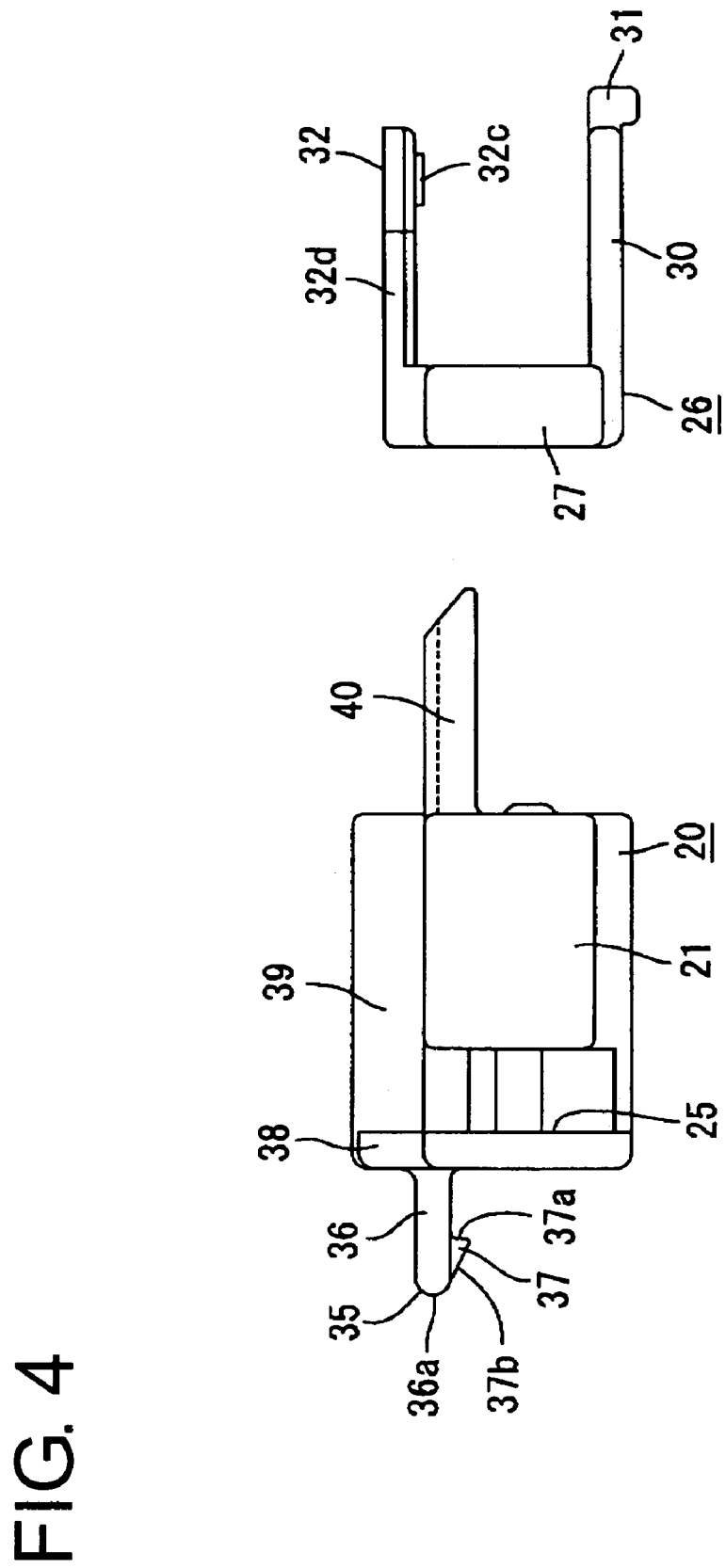
FIG. 4 is a left side view of the inner housing and the retainer.

A male connector according to the invention is described with reference to FIGS. 1 to 15. The connector has a watertight function in this embodiment. Additionally, the male connector has a housing H for accommodating male terminal fittings 10. The housing H is divided into an inner housing 20 and an outer housing 50, and a retainer 26 for locking the male terminal fittings 10 is mountable into the inner housing 20. In the following description, a side toward which the male terminal fittings 10 are inserted is referred to as the front and reference is made to FIGS. 1 and 5 concerning vertical direction.

Each male terminal fitting 10 is press-formed of a metallic plate and has a substantially box-shaped main portion 11. A tab 12 projects forward from the main portion 11 and is electrically connectable with a mating female terminal fitting (not shown). A barrel 13 projects back from the main portion 11 and includes front and rear pairs of crimping pieces 13a, 13b. The front crimping pieces 13a are crimped, bent or folded into connection with a core of the wire D and the rear crimping pieces 13b are crimped, bent or folded into connection with a rubber plug 17 mounted on an insulation coating of the wire D. A lock 14 is cantilevered rearwardly from the bottom surface of the main portion 11 and a jaw 16 is provided on the bottom surface of the main portion 11 rearwardly of the lock 14.

Figure 8:
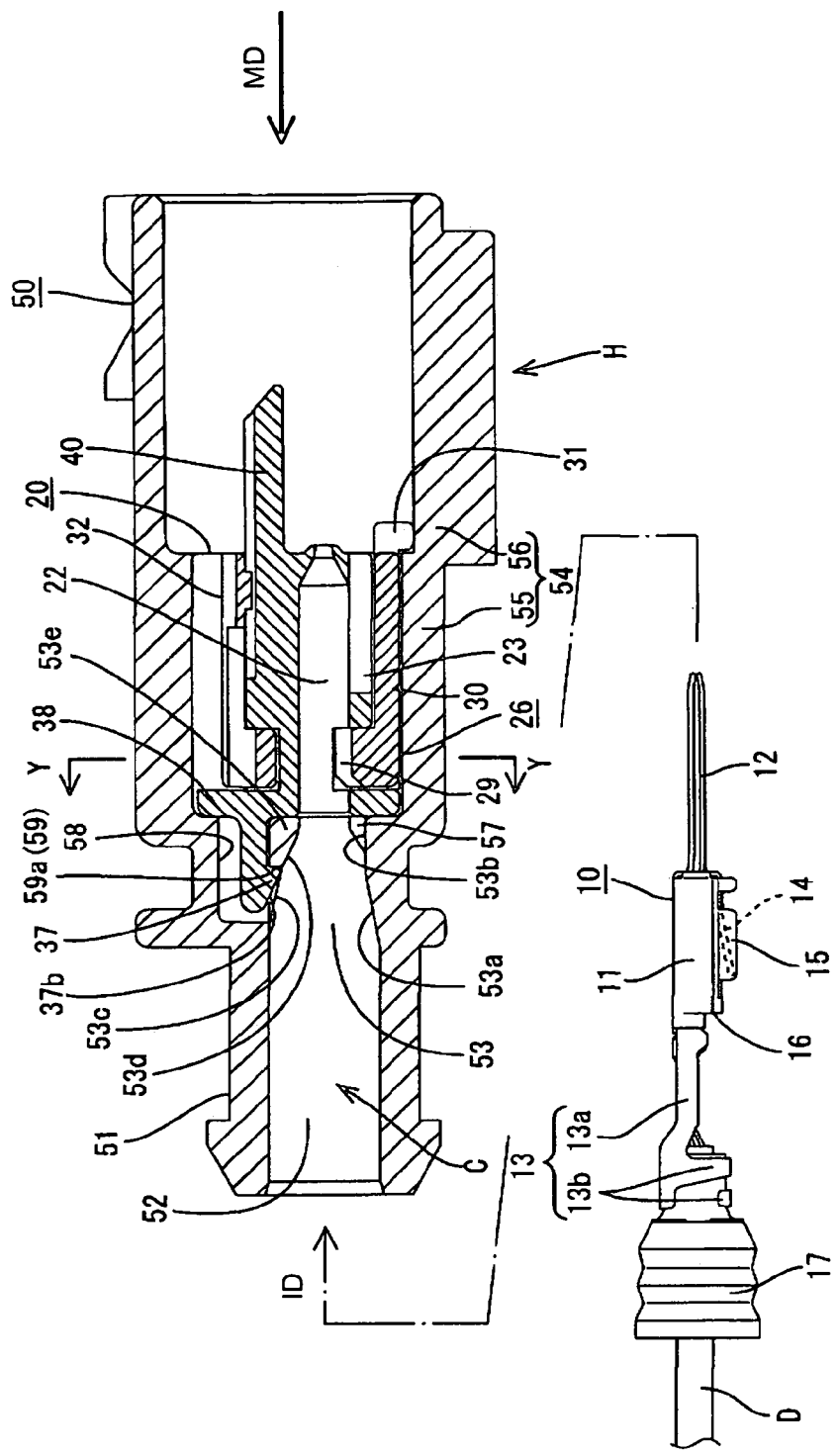
FIG. 8 is a section along 8—8 of FIG. 6.
Figure 9:
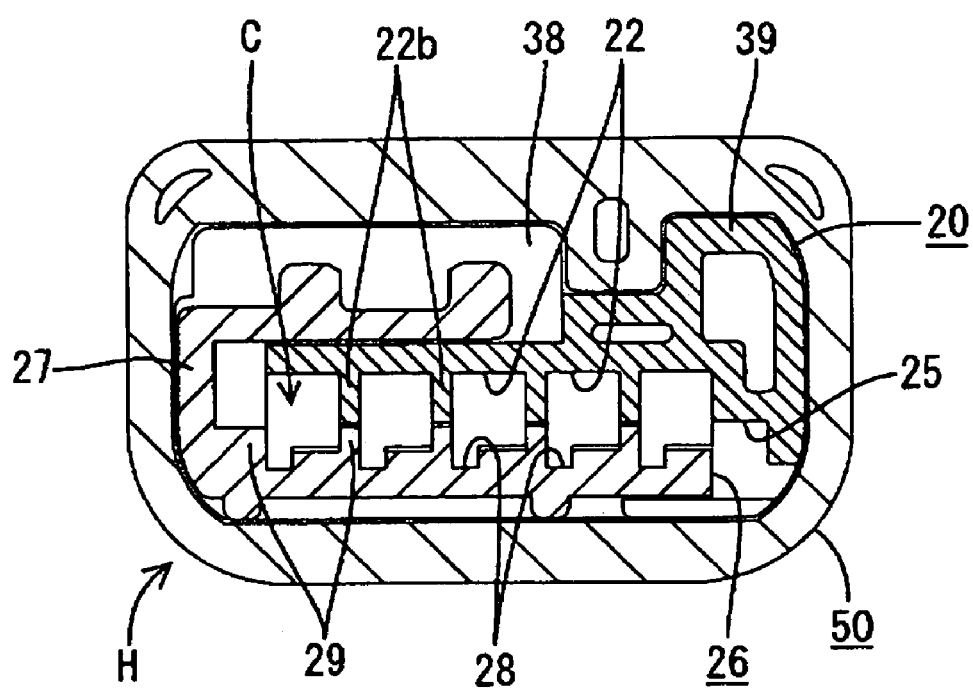
FIG. 9 is a section along 9—9 of FIG. 8.

Cavities C are arranged substantially side by side in a widthwise direction WD in the housing H and the male terminal fittings 10 can be inserted into the cavities C along an inserting direction ID, as shown in FIG. 8. Each cavity C has a small front portion 22, a larger rear portion 52 and a tapered intermediate portion 54. The small front portion 22 has a substantially square cross section and is adapted to accommodate the main portion 11 and the front crimping pieces 13a of the male terminal fitting 10. The large rear portion 52 has a vertically long rectangular cross section and is adapted to accommodate the rubber plug 17. The tapered intermediate portion 53 of each cavity C has a height that is gradually reduced from a rear side adjacent the large portion 52 toward a front side adjacent the small portion 22. The tapered portion 53 is adapted to accommodate the rear crimping pieces 13b of the barrel 13. The housing H is divided into an outer housing 50 and an inner housing 20. The larger portions 52 and the tapered portions 53 are in the outer housing 50, whereas the smaller portions 22 are in the inner housing 20.

The inner housing 20 is made e.g. of a synthetic resin and includes a main portion 21 substantially in the form of a wide block, and the small portions 22 of the cavities C are provided in the main portion 21, as shown in FIGS. 1 to 5. A forwardly open locking groove 23 is formed in the bottom surface of each small portion 22, and the lock 14 of the corresponding male terminal fitting 10 is engageable with the rear surface of the locking groove 23. A rearwardly open stabilizer insertion groove 24 is formed at the lower right of the bottom surface of each small portion 22 in FIG. 2 and receives the stabilizer 15 of the male terminal fitting 10.

A retainer mount recess 25 is formed in the left surface of the main body 21, as shown in FIG. 1, and crosses the small portion 22 slightly behind the locking grooves 23. Thus, the retainer 26 can enter the small portions 22. Specifically, bottom walls 22a and lower parts of side walls 22b of the respective small portions 22 are cut off by the retainer mount recess 25 (see FIG. 9).

The retainer 26 is made e.g. of a synthetic resin and has a main portion 27 that is U-shaped when viewed from the front. The upper surface of a bottom part of the main portion 27 has a shape substantially conforming with the inner surfaces of the small portions 22. More particularly, the upper surface of the bottom part of the main portion 27 has communication grooves 28 that communicate with the stabilizer insertion grooves 24 and locking sections 29 that engage the corresponding male terminal fittings 10. The locking sections 29 also serve as part of the side walls 22b of the small portions 22 of the respective cavities C. A guide 30 projects forward from the lower side of the bottom part of the main portion 27. The guide 30 is a substantially flat plate for guiding a mounting operation of the retainer 26. A retainer operating portion 31 projects from the front end surface of the guide 30 and enables the retainer 26 to be operated from outside.

A retainer holding portion 32 projects from an upper side of an upper part of the main portion 27 of the retainer 26 for holding the retainer 26 in the inner housing 20. The retainer holding portion 32 has two arms 32a that extend forward. A thin arcuate flexible portion 32b couples the front ends of the arms 32a, and a holding projection 32c projects from the lower surface of the flexible portion 32b. The retainer 26 is movable along the widthwise direction WD between a partial locking position and a full locking position. The retainer 26 can be held at the partial locking position or at the full locking position by engaging the holding projection 32c with a partial locking groove 33 or a full locking groove 34 in the upper surface of the main portion 21 of the inner housing 20. At the partial locking position, the communication grooves 28 communicate with the corresponding stabilizer insertion grooves 24 and the locking sections 29 are retracted sideways from the corresponding smaller portions 22 to serve as parts of the sidewalls 22b. Thus, insertion and withdrawal of the male terminal fittings 10 into and from the cavities C are permitted (see FIGS. 6 to 9). On the other hand, the locking sections 29 enter the corresponding smaller portions 22 to engage the jaws 16 of the male terminal fittings 10 (see FIGS. 12 to 14) when the retainer 26 is in the full locking position to lock the respective terminal fittings 10. The front ends of the retainer holding portion 32 and the guide 30 substantially align with the front end of the inner housing 20 when the retainer 26 is in the retainer mount recess 25. However, the retainer operating portion 31 projects more forward than the front end surface of the inner housing 20.

The inner housing 20 and the retainer 26 are mountable into the outer housing 50 from the front along a mounting direction MD that is substantially opposite to the insertion direction ID. A lock 35 is cantilevered back in the mounting direction MD from the rear end of the main portion 21 for holding the inner housing 20 assembled with the outer housing 50. The lock 35 has a flexible arm 36 that is resiliently displaceable up and down in a direction that intersects the mounting direction MD. A claw 37 projects from a lower side of the leading end of the flexible arm 36 and is narrower than the flexible arm 36. A vertical locking surface 37a is formed on the front of the claw 37 and extends normal to the mounting direction MD. However, a slanted surface 37b is formed at the rear of the claw 37 and is sloped up and to the back. The slanted surface 37b is substantially continuous with an arcuate surface 36a on the rear of the flexible arm 36. A restricting wall 38 projects on the upper surface of the main portion 21 behind the retainer mount recess 25 for restricting a mounting depth of the inner housing 20 into the outer housing 50. A restricting portion 39 with a similar function projects at the right end of the upper surface of the main portion 21 in FIG. 1. On the other hand, a wide rib 40 projects forward from the front end surface of the upper part of the main portion 21, and the upper surface of the rib 40 is substantially flush with the upper surface of the main portion 21. The partial locking groove 33 and the full locking groove 34 are formed in the upper surface of the rib 40 and open forward to facilitate the molding (see FIG. 3).

The outer housing 50 is made e.g. of a synthetic resin and has a wide block shape. More particularly, the outer housing has a main portion 51 in which the large portions 52 and the tapered portions 53 of the cavities C are provided and a receptacle 54 in the form of a rectangular tube that projects forward from the main portion 51. A rear part of the receptacle 54 bulges in on inner upper and lower surfaces to define an inner-housing accommodating portion 55 for accommodating the inner housing 20. The front part of the receptacle 54 defines a female-connector fitting portion 56 for receiving a mating female connector (not shown). The restricting wall 38 and the restricting portion 39 of the inner housing 20 are stopped by the front surface of the main portion 51.

The tapered portion 53 includes a lower slanted surface 53a that slopes up toward the front from the large portion 52 and a horizontal surface 53b that extends forward along the inserting direction ID from the slanted surface 53a, as illustrated in FIGS: 5 and 8,. The tapered portion 53 also includes an upper surface with a first slanted surface 53c that slopes down toward the front from the large portion 53 and a second slanted surface 53d that extends forward from the first slanted surface 53c, but at a steeper slope. The rear end of the first slanted surface 53c is more forward than the rear end of the slanted surface 53a. A protrusion 57 is provided at a front-left end of the lower surface of the tapered portion 53 in FIG. 2 and has a rear surface that is a slanted steeper than the slanted surface 53a.

A forwardly open recess 58 is formed in the front of the main portion 51 above the second cavity C from the left in FIG. 1 for receiving the lock 35 of the inner housing 20. The recess 58 communicates with the tapered portion 53 via the receiving portion 59, and is formed by partially cutting off an upper wall 53e of the tapered portion 53 of the cavity C. The receiving portion 59 is formed by cutting off the first slanted surface 53c of the upper wall 53e of the tapered portion 53 by a specified width over the entire length so that the claw 37 of the lock 35 can enter the receiving portion 59. Accordingly, the claw 37 of the lock 35 forms part of the upper wall 53e of the tapered portion 53. The front of the receiving portion 59 defines a substantially vertical locking surface 59a that is substantially normal to the mounting direction MD and/or the inserting direction ID. The locking surface 59a is engageable with the locking surface 37a of the lock 35. The locking surface 59a of the receiving portion 59 is exposed backward to the outside through the cavity C (see FIGS. 2 and 5). The slanted surface 37b of the lock 35 has substantially the same inclination as the second slanted surface 53d, and the slanted surface 37b of the lock 35 and the second slanted surface 53d form one substantially continuous slanted surface in the locked state of the inner housing 20 (see FIG. 8).

Figure 5:
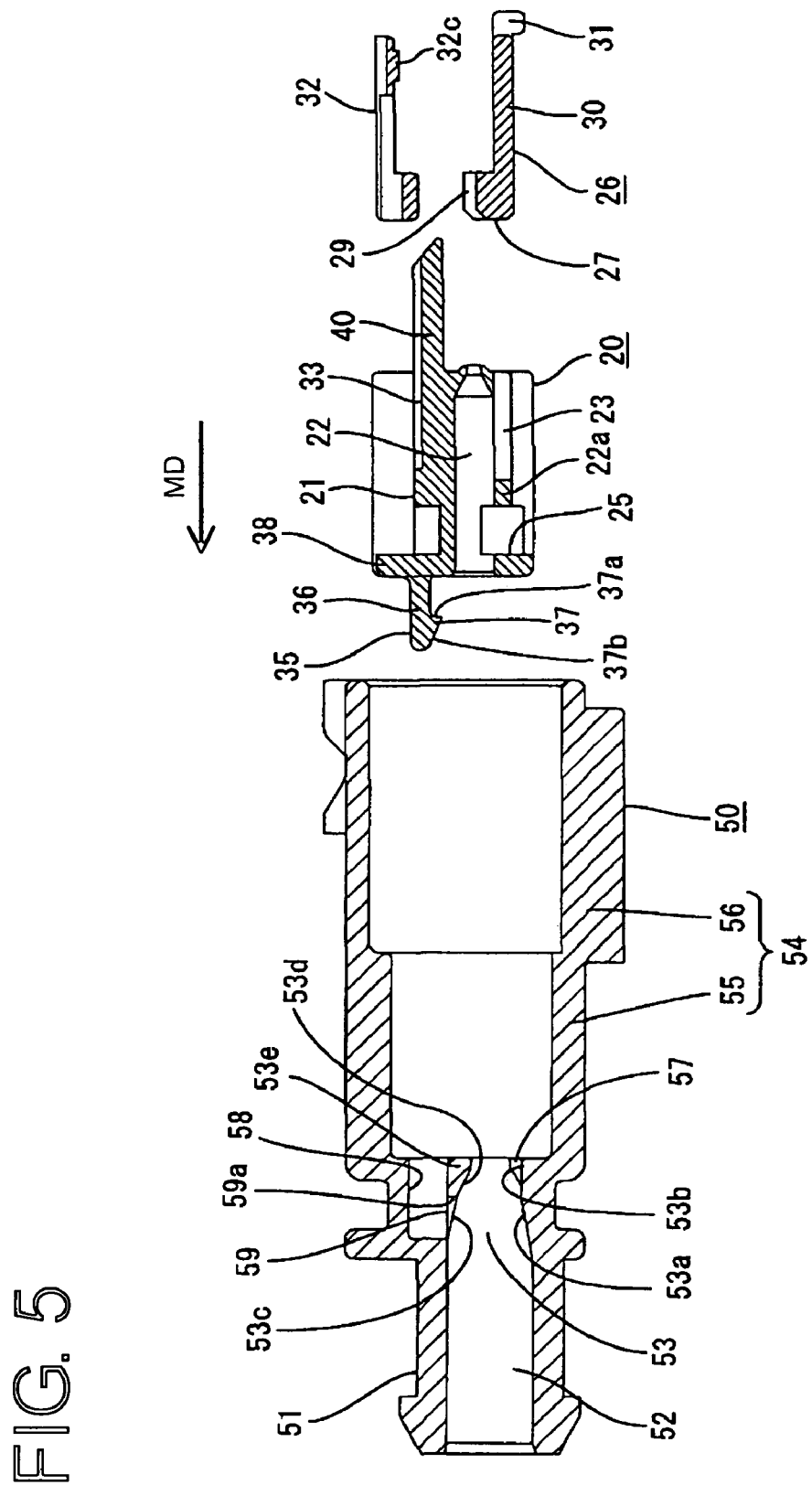
FIG. 5 is a section along 5—5 of FIG. 1.
Figure 6:
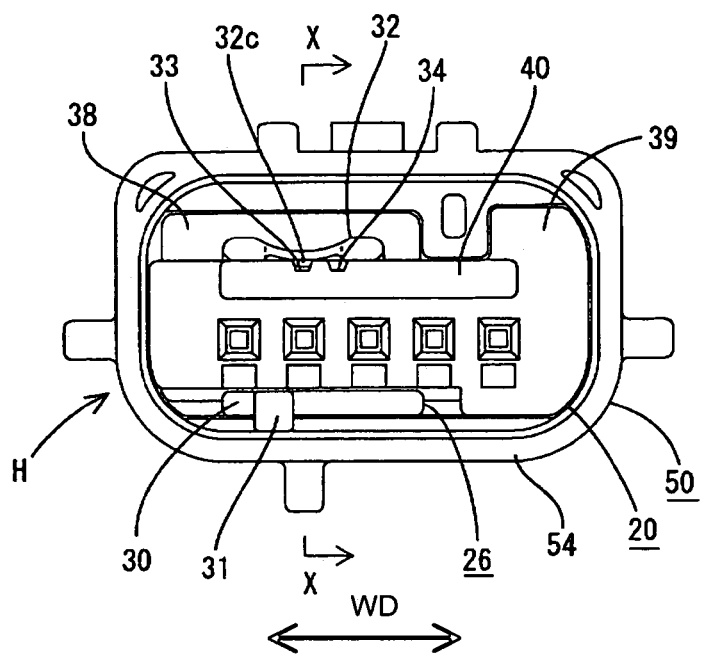
FIG. 6 is a front view showing the inner housing mounted in the outer housing and the retainer at a partial locking position.
Figure 7:
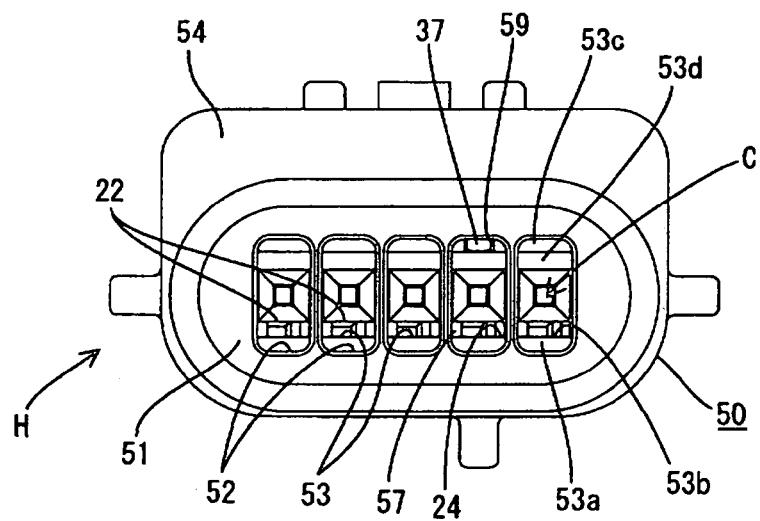
FIG. 7 is a rear view showing a state where the inner housing having the retainer mounted therein is mounted in the outer housing.

The retainer 26 can be assembled to the inner housing 20 at the partial locking position, as shown in FIG. 5. The inner housing 20 then is inserted into the inner-housing accommodating portion 55 of the outer housing 50 from the front. In this process, the slanted surface 37b of the claw 37 is guided onto the bottom surface of the recess 58. Thus, the flexible arm 36 is displaced resiliently up in the recess 58. The claw 37 then enters the receiving portion 59 and the flexible arm 36 returns when the inner housing 20 is mounted to a proper depth and the locking surfaces 37a, 59a engage. Accordingly, the inner housing 20 is held undetachably in the outer housing 50. Additionally, the restricting wall 38 and the restricting portion 39 contact the front surface of the main portion 51 to restrict a mounting depth. In this state, the claw 37 of the lock 35 is part of the upper wall 53e of the sloped portion 53 of the cavity C.

Figure 10:
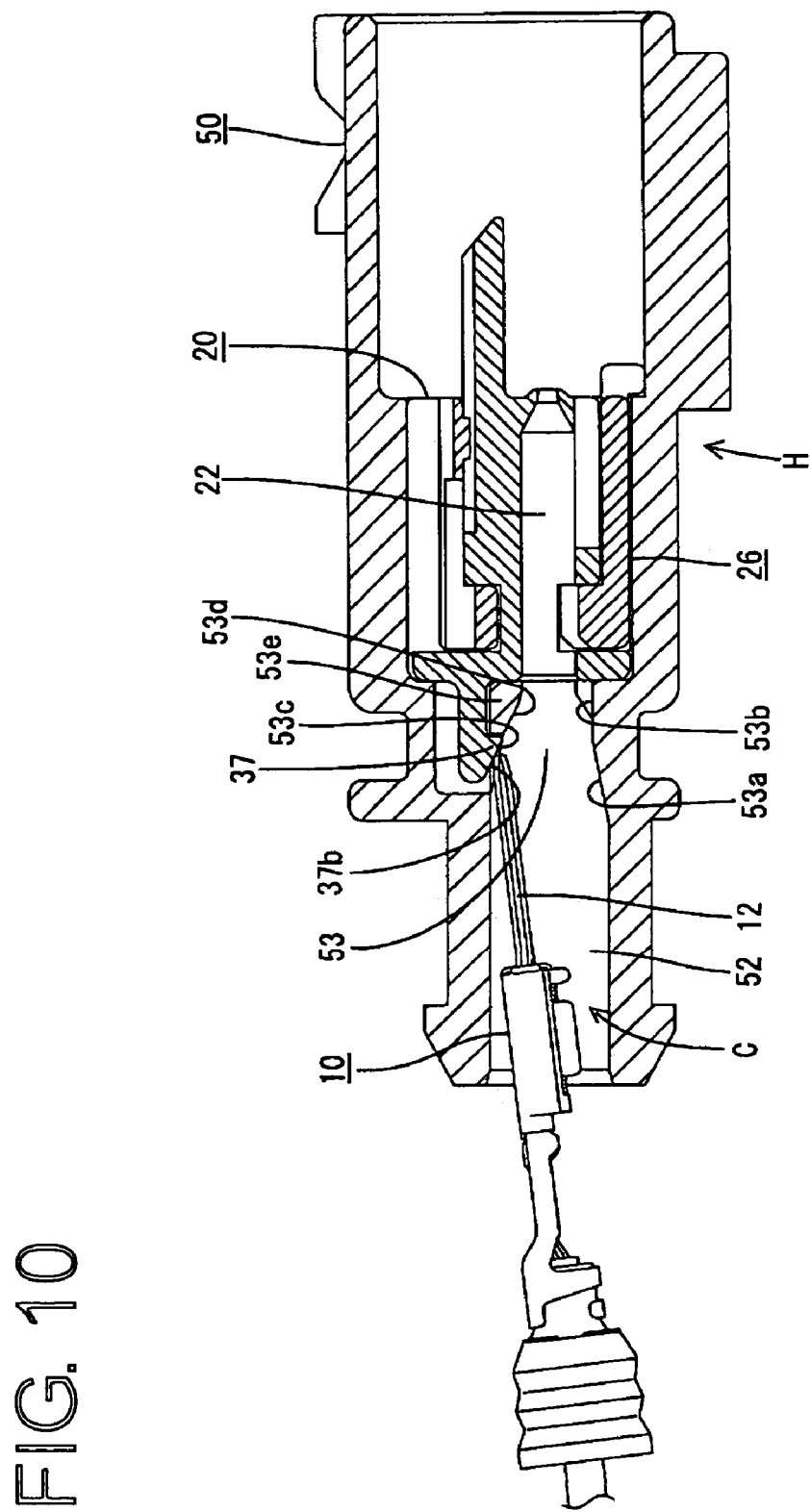
FIG. 10 is a section similar to FIG. 8, but showing an intermediate state of the insertion of a male terminal fitting in an inclined orientation.
Figure 11:
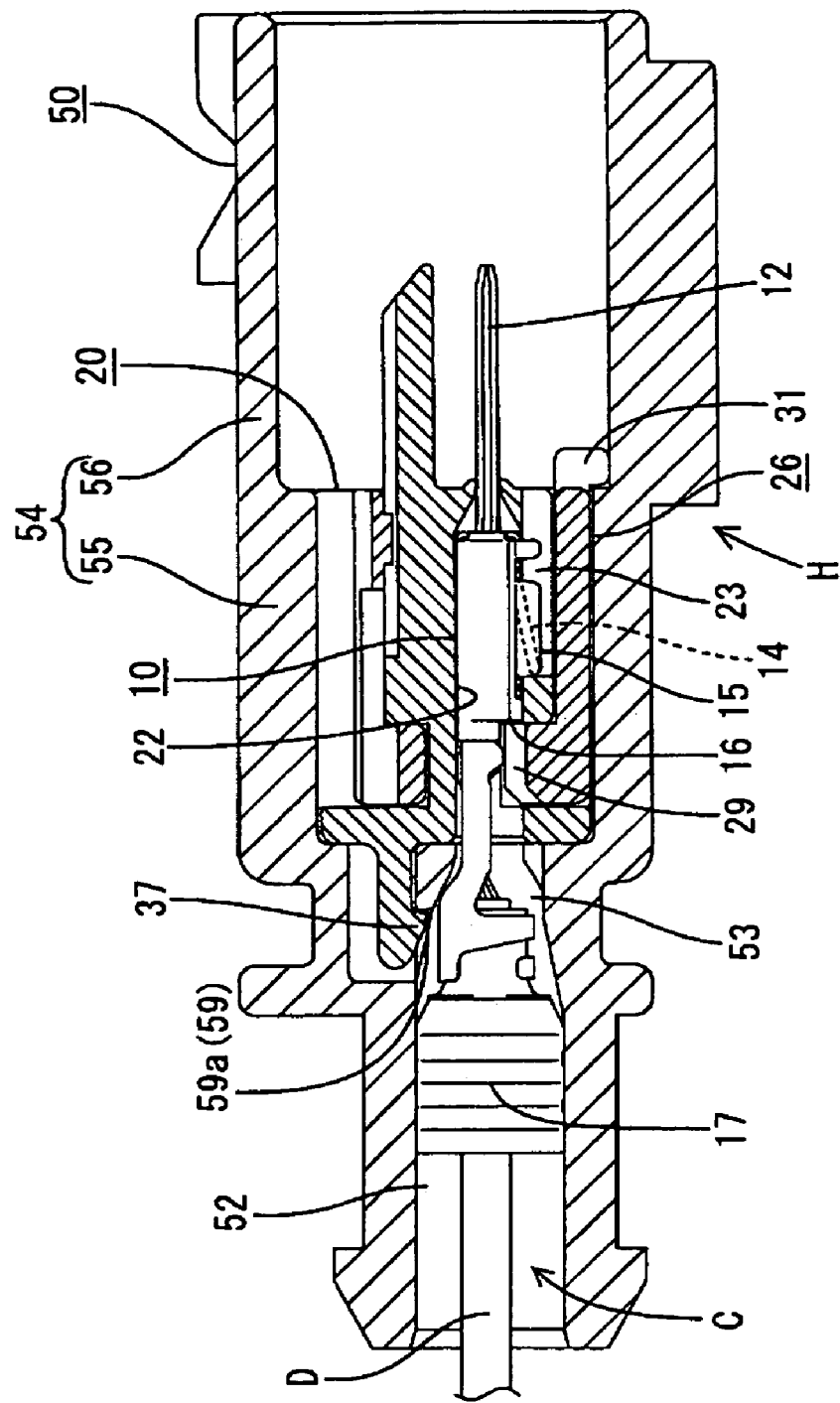
FIG. 11 is a section similar to FIG. 8, but showing a state where the male terminal fitting is inserted to a proper depth.
Figure 12:
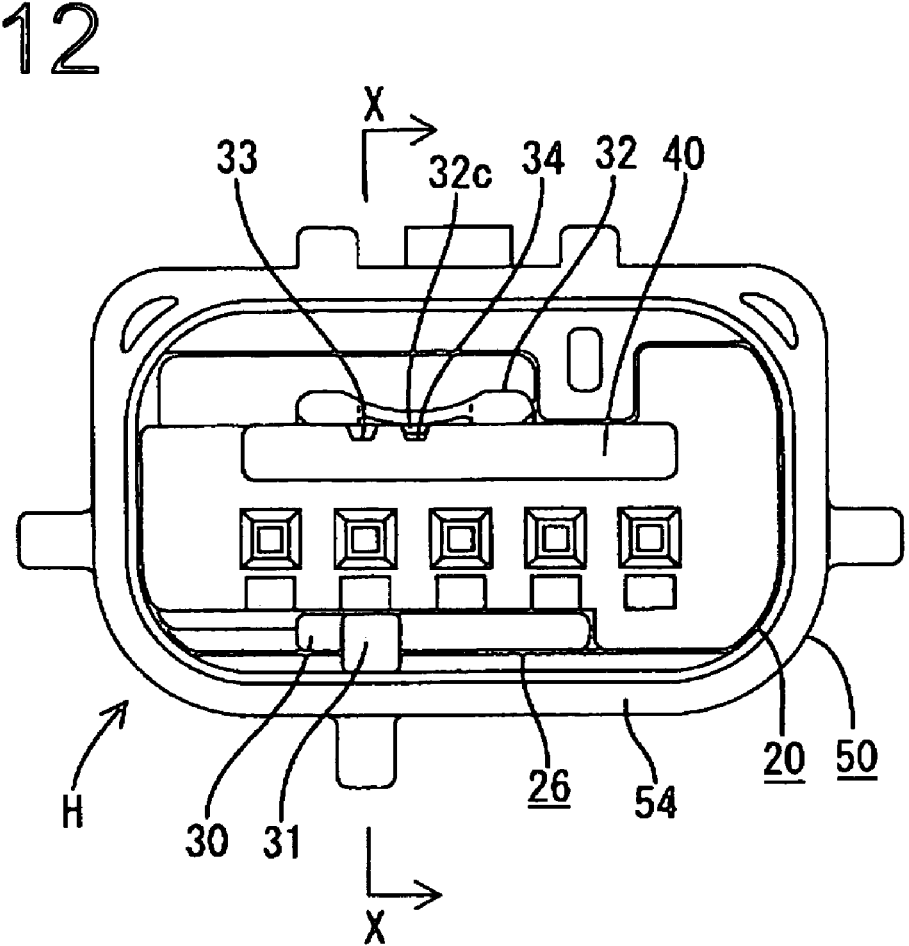
FIG. 12 is a front view showing a state where the inner housing is mounted in the outer housing and the retainer is located at a full locking position.

The male terminal fittings 10 then are inserted into the respective cavities C in the inserting direction ID. The insertion of the male terminal fittings 10 is guided by the passage of the stabilizers 15 along the stabilizer inserting grooves 24 and the communication grooves 28. The longitudinal axis of the male terminal fitting 10 could be inclined in the inserting process, as shown in FIG. 10. However, the tab 12 slides in contact with the slanted surface 37b of the lock 35 and the inner surfaces 53a to 53d of the tapered portion 53 to correct the orientation of the male terminal fitting 10. The flexible arm 36 of the lock 35 has a sufficient rigidity so as not to be displaced by a light pushing force exerted by the tab 12 held substantially in sliding contact. The resiliently deformed lock 14 is restored when the male terminal fitting 10 is inserted to a substantially proper depth in the cavity C and engages the rear surface of the locking groove 23, as shown in FIG. 11. Thus, the male terminal fitting 10 is locked partly.

Figure 13:
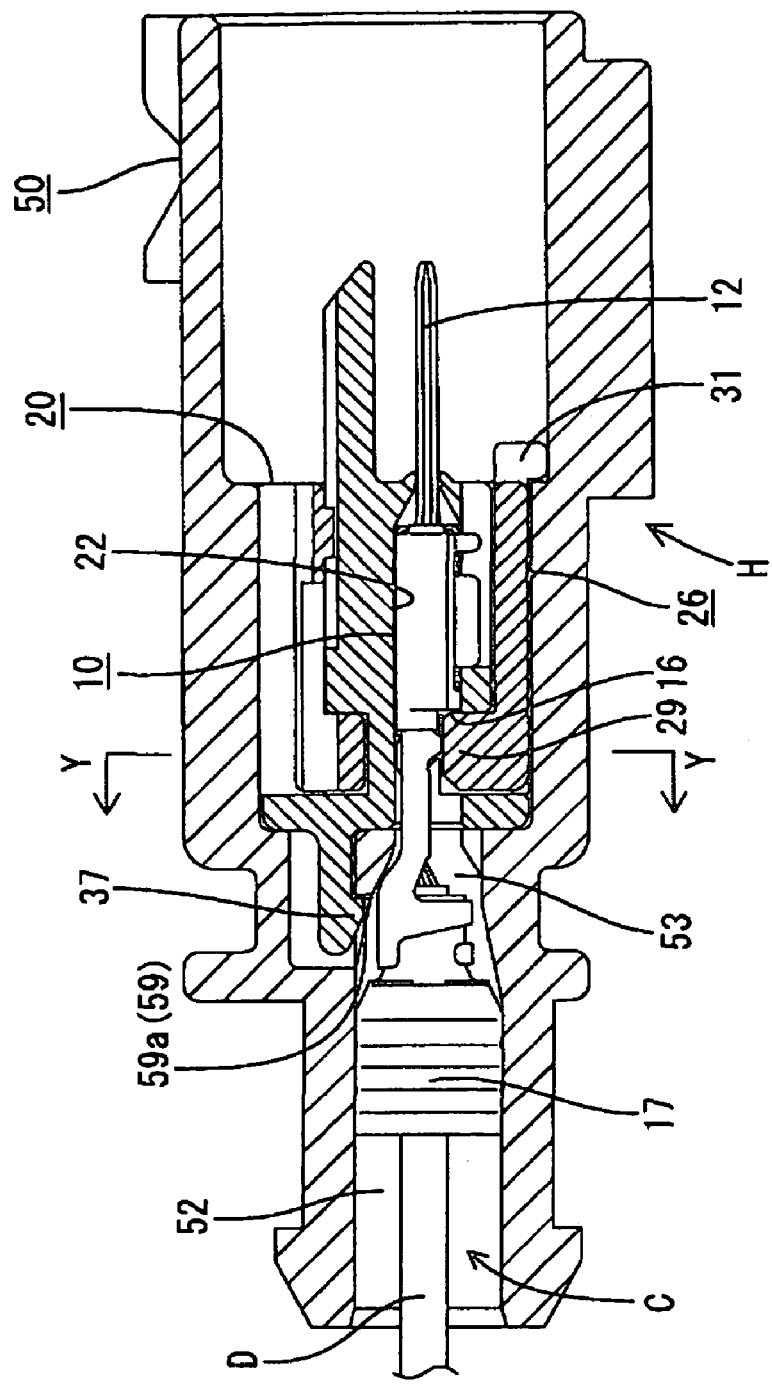
FIG. 13 is a section along 13—13 of FIG. 12.
Figure 14:
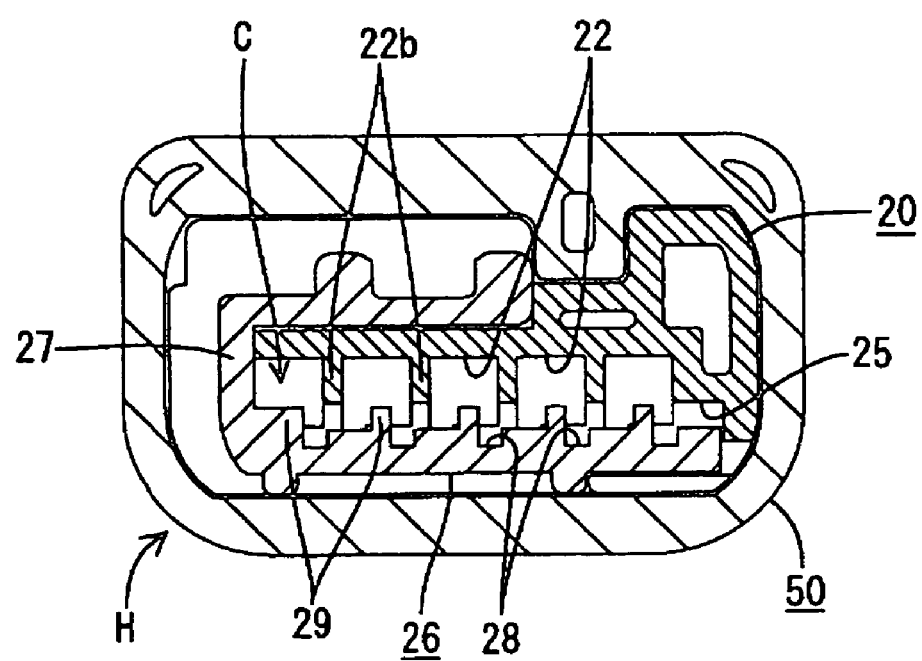
FIG. 14 is a section along 14—14 of FIG. 13.
Figure 15:
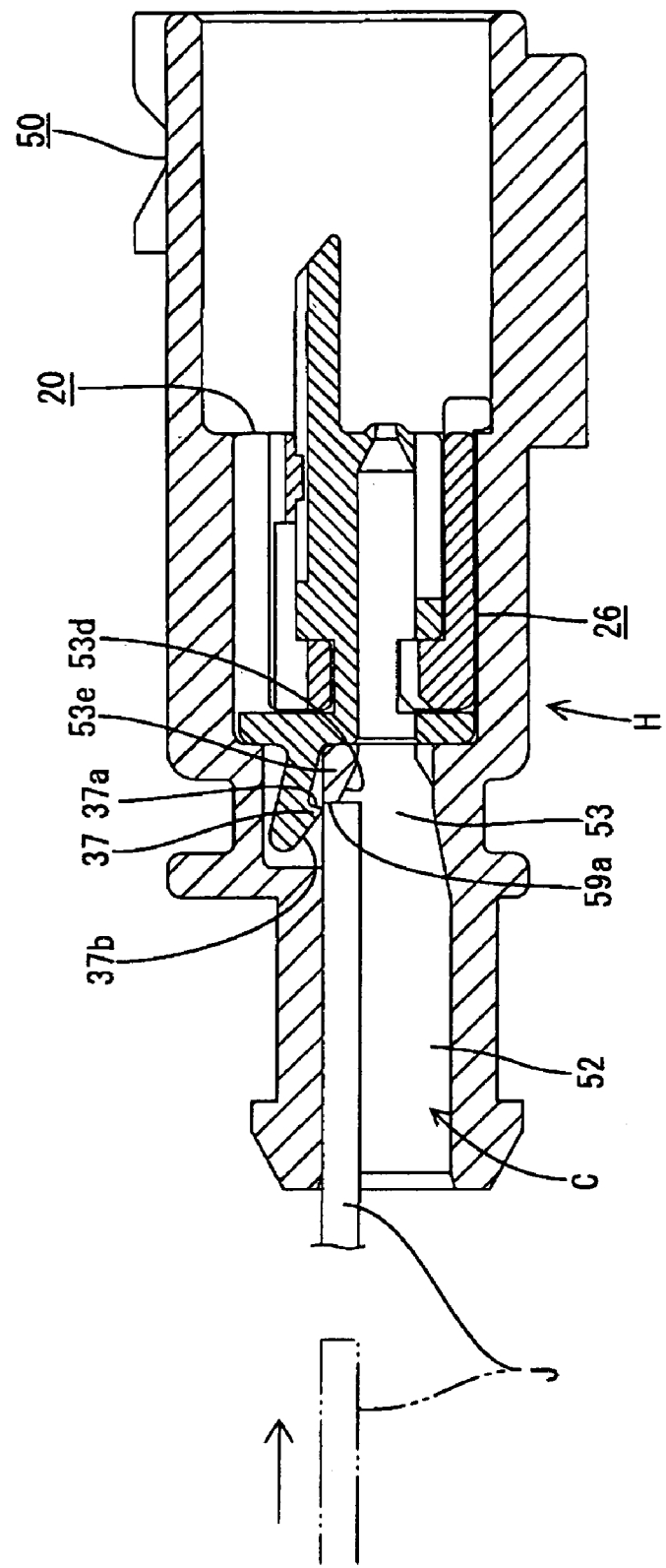
FIG. 15 is a section similar to FIG. 8, but showing a state where a disengagement jig for disengaging a lock portion is inserted into a cavity.
Figure 16:
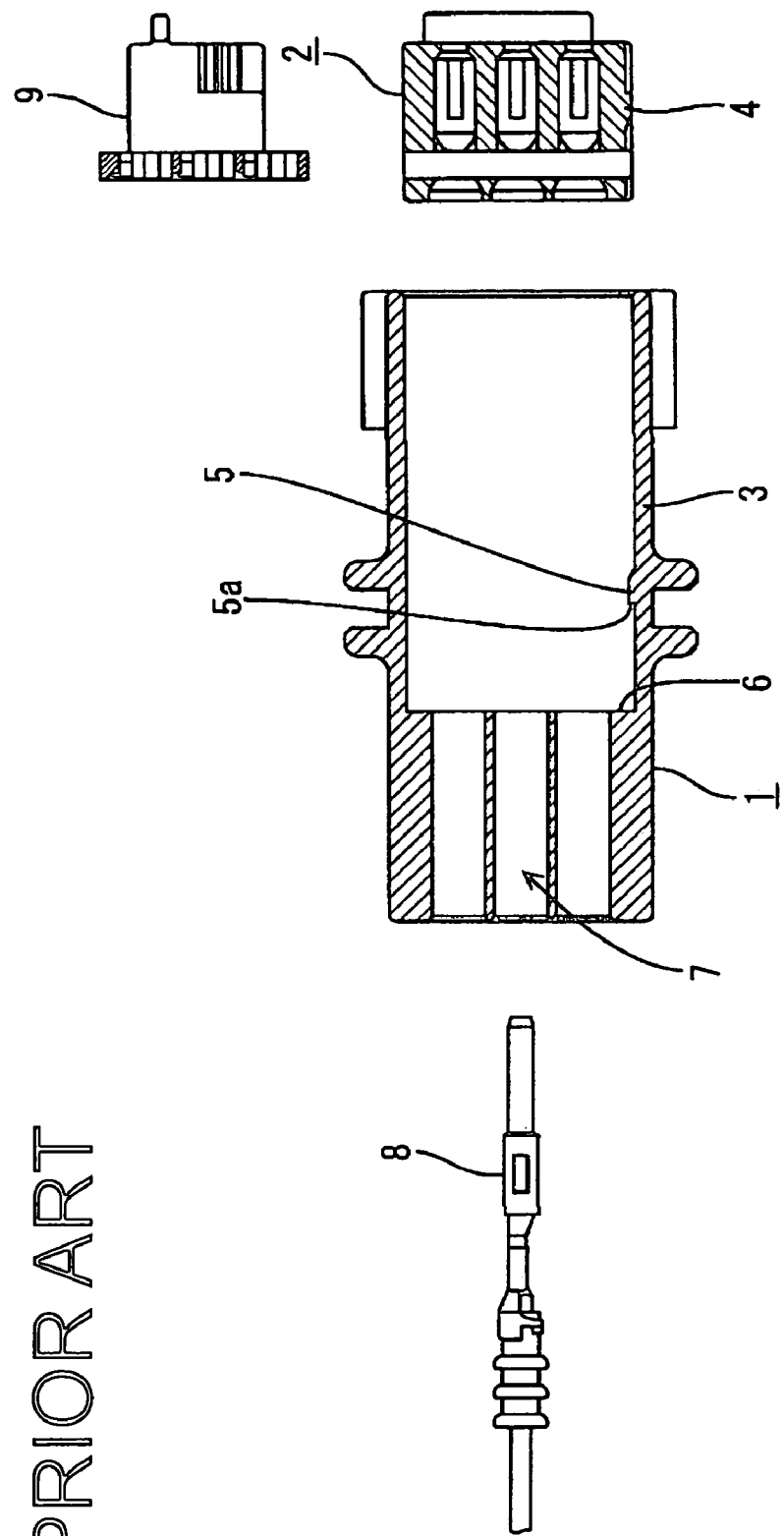
FIG. 16 is an exploded section of a prior art connector.

A jig or the like is inserted into the receptacle 54 from the front after the male terminal fittings 10 have been inserted properly. The jig engages the retainer operating portion 31 to move the retainer 26 to the full locking position shown in FIG. 12. As a result, the locking sections 29 enter the smaller portions 22 of the corresponding cavities C and engage the jaws 16 of the male terminal fittings 10 to lock the male terminal fittings 10 fully, as shown in FIGS. 13 and 14. As a result, the male terminal fittings 10 are locked doubly so as not to come out of the cavities C. Thereafter, the unillustrated female connector can be fit into the female-connector fitting portion 56 of the receptacle 54.

It may be necessary to check if the retainer 26 and the inner housing 20 are damaged or it may be necessary to exchange the retainer 26 and the inner housing 20 for maintenance. Thus, the retainer 26 is moved to the partial locking position and the locks 14 are deformed by a jig so that the male terminal fittings 10 can be withdrawn. Thereafter, a bar-shaped disengagement jig J is inserted from behind into the second cavity C from the right in FIG. 7. The disengagement jig J is inserted substantially straight in forward and backward direction and slides in contact with the upper surface of the cavity C. Thus, the disengagement jig J is guided by the slanted surface 37b of the claw 37 and displaces the arm 36 sufficiently to cancel the locked state. Operability is good since the locked state is canceled merely by inserting the disengagement jig J straight. Thereafter, the inner housing 20 is withdrawn forward from the receptacle 54.

As described above, the locking surface 59a of the receiving portion 59 is exposed backward to the outside through the cavity C. Thus, the locking surface 59a of the receiving portion 59 can be formed by a mold removed backward using the large portion 52 of the cavity C. Accordingly, it is unnecessary to use the prior art slidable mold to form the locking surface of the receiving portion. As a result, the connector can be miniaturized while reducing production costs.

The claw 37 of the lock 35 also serves as part of the upper wall 53e of the tapered portion 53 of the cavity C while being engaged with the receiving portion 59. Thus, the male terminal fitting 10 is guided by the lock 35 when the male terminal fitting 10 is inserted into the cavity C.

The slanted surface 37b of the lock 35 has an inclination substantially corresponding to the tapered portion 53. Thus, the lock 35 can be disengaged easily from the receiving portion 59 merely by inserting the disengagement jig J substantially straight into the cavity C in forward and backward directions, thereby improving a detaching operability.

The invention is not limited to the above described and illustrated embodiment. For example, the following embodiments are also embraced by the technical scope of the present invention as defined by the claims. Beside the following embodiments, various changes can be made without departing from the scope and spirit of the present invention as defined by the claims.

The lock includes the flexible arm and the receiving portion is a recess in the foregoing embodiment. However, the receiving portion may be a flexible arm projecting from the front surface of the main portion of the outer housing and a claw may be at the leading end of the flexible arm. A locking surface of the claw may be exposed backward to outside through the cavity, and the lock may be in the form of a recess in the outer surface of the inner housing.

The receiving portion is in the tapered portion of the cavity in the foregoing embodiment. However, it may be in the larger portion of the cavity. In the case that the outer housing partially forms the smaller portions of the cavities, the receiving portion may be in the smaller portion.

The cavities have a substantially rectangular cross section over the entire length in the foregoing embodiment. However, they may have a substantially round or oval cross section over the entire length. Alternatively, a rear half may have a substantially round or oval cross section while the front half may have a substantially rectangular cross section.

The retainer is of the side type, and is directly engageable with the male terminal fittings in the foregoing embodiment. However, the present invention is also applicable, for example, to connectors with no retainer.

Although the male connector is illustrated in the foregoing embodiment, the present invention is similarly applicable to female connectors.

Although the watertight connector is illustrated in the foregoing embodiment, the present invention is also applicable to nonwatertight connectors.

What is claimed is:

1. A connector having a connector housing with opposite front and rear ends and at least one cavity extending between the front and rear ends, the cavity being configured for receiving a terminal fitting from behind and along an insertion direction, wherein:

the connector housing being divided into an inner housing and an outer housing into which the inner housing is mountable in a mounting direction from the front; and a receiving portion in the outer housing engageable with a lock in the inner housing to hold the inner housing undetachably, the receiving portion having a locking surface for engaging the lock and being exposed rearwardly to outside through the cavity, wherein the lock also serves as at least a part of an inner wall of the cavity while being engaged with the receiving portion.

2. The connector of claim 1, wherein a retainer is mountable to the inner housing, the retainer having a locking section for locking the terminal fitting in the inner housing.

3. The connector of claim 2, wherein the retainer can be positioned in a first position, where insertion of the terminal fitting is permitted, and in a second position, where the terminal fitting is locked to the inner housing.

4. The connector of claim 3, wherein the locking section forms at least part of an inner wall of the cavity when the retainer is in the first position.

5. A connector having a connector housing with opposite front and rear ends and at least one cavity extending between the front and rear ends, the cavity being configured for receiving a terminal fitting from behind and along an insertion direction, wherein:

the connector housing being divided into an inner housing and an outer housing into which the inner housing is mountable in a mounting direction from the front; and a receiving portion in the outer housing engageable with a lock in the inner housing to hold the inner housing undetachably, the receiving portion having a locking surface for engaging the lock and being exposed rearwardly to outside through the cavity, wherein the cavity comprises a large portion at a rear side, a small portion forward of the large portion and a tapered portion therebetween.

6. The connector of claim 5, wherein the lock comprises a slanted surface extending substantially along the tapered portion.

* * * * *